(12) United States Patent
Chew et al.

(10) Patent No.: US 8,606,238 B2
(45) Date of Patent: *Dec. 10, 2013

(54) USER-INITIATED COMMUNICATIONS DURING MULTIMEDIA CONTENT PLAYBACK ON A MOBILE COMMUNICATIONS DEVICE

(75) Inventors: Gregory T. H. Chew, Albany, CA (US); Donald J. Pilcher, Half Moon Bay, CA (US); Kevin Thornton, Cupertino, CA (US)

(73) Assignee: Videopression LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/369,162

(22) Filed: Feb. 8, 2012

(65) Prior Publication Data

US 2012/0142317 A1     Jun. 7, 2012

Related U.S. Application Data

(63) Continuation of application No. 12/820,482, filed on Jun. 22, 2010, which is a continuation of application No. 11/560,331, filed on Nov. 15, 2006, now Pat. No. 7,769,363.

(60) Provisional application No. 60/820,969, filed on Aug. 1, 2006.

(51) Int. Cl.
*H04W 4/00* (2009.01)

(52) U.S. Cl.
USPC ........ 455/412.1; 455/566; 455/419; 370/311; 370/329; 370/338

(58) Field of Classification Search
USPC .............. 348/468, 43, 42, 722; 386/239, 217, 386/214, 278, 285, 282, 242.24, 284, 343; 455/412.1, 425, 566, 419; 370/311, 370/329, 338
See application file for complete search history.

(56) References Cited

U.S. PATENT DOCUMENTS

| 6,282,548 | B1  |  8/2001 | Burner et al. |
|---|---|---|---|
| 7,283,803 | B2  | 10/2007 | Karaoguz et al. |
| 7,954,056 | B2* |  5/2011 | Graham .................. 715/716 |
| 2002/0069218 | A1 |  6/2002 | Sull et al. |
| 2002/0151327 | A1 | 10/2002 | Levitt |
| 2003/0013483 | A1 |  1/2003 | Ausems et al. |

(Continued)

FOREIGN PATENT DOCUMENTS

| JP | 2002259720 | 9/2002 |
|---|---|---|
| JP | 2004013206 | 1/2004 |

(Continued)

OTHER PUBLICATIONS

USPTO; PCT International Search Report for Serial No. PCT/US07/74887; Jul. 8, 2008; 3 Pages.

(Continued)

*Primary Examiner* — Joseph Arevalo
(74) *Attorney, Agent, or Firm* — Stolowitz Ford Cowger LLP

(57) ABSTRACT

A multimedia display process executing in a mobile device traps user input signals to allow switching from display of multimedia to another task without requiring manual termination of the multimedia display process by the user.

20 Claims, 5 Drawing Sheets

(56) References Cited

U.S. PATENT DOCUMENTS

| | | | |
|---|---|---|---|
| 2003/0093810 A1* | 5/2003 | Taniguchi | 725/112 |
| 2004/0117735 A1 | 6/2004 | Breen | |
| 2004/0204135 A1 | 10/2004 | Zhao et al. | |
| 2004/0218902 A1* | 11/2004 | Yanagita | 386/52 |
| 2004/0224638 A1 | 11/2004 | Fadell et al. | |
| 2005/0091107 A1 | 4/2005 | Blum | |
| 2005/0149557 A1 | 7/2005 | Moriya et al. | |
| 2005/0210145 A1 | 9/2005 | Kim et al. | |
| 2005/0223034 A1 | 10/2005 | Kaneko et al. | |
| 2006/0026638 A1* | 2/2006 | Stark et al. | 725/38 |
| 2006/0041927 A1* | 2/2006 | Stark et al. | 725/139 |
| 2006/0121939 A1 | 6/2006 | Anwar et al. | |
| 2006/0159109 A1 | 7/2006 | Lamkin et al. | |
| 2006/0224761 A1 | 10/2006 | Howarth et al. | |
| 2006/0258289 A1 | 11/2006 | Dua | |
| 2006/0271977 A1* | 11/2006 | Lerman et al. | 725/88 |
| 2007/0010195 A1 | 1/2007 | Brown et al. | |
| 2007/0087686 A1 | 4/2007 | Holm et al. | |
| 2007/0143797 A1 | 6/2007 | Sammarco | |
| 2007/0156770 A1 | 7/2007 | Espelien | |
| 2007/0189708 A1* | 8/2007 | Lerman et al. | 386/52 |
| 2007/0255754 A1 | 11/2007 | Gheel | |
| 2008/0032688 A1* | 2/2008 | Chew et al. | 455/425 |
| 2008/0045140 A1 | 2/2008 | Korhonen | |
| 2010/0261455 A1* | 10/2010 | Chew et al. | 455/412.1 |
| 2010/0318532 A1* | 12/2010 | Sznajder et al. | 707/759 |

FOREIGN PATENT DOCUMENTS

| | | |
|---|---|---|
| JP | 2005269365 | 9/2005 |
| JP | 2006040259 | 2/2006 |
| JP | 2006050275 | 2/2006 |
| JP | 2006129462 | 5/2006 |
| KR | 1020050108246 | 4/2006 |
| WO | 2005036859 | 4/2005 |
| WO | 2008016936 | 2/2008 |

OTHER PUBLICATIONS

USPTO; PCT Written Opinion for Serial No. PCT/US07/74887; Jul. 8, 2008; 5 Pages.

European Patent Office; "European Search Report for EP 07840619.6"; May 23, 2011, 6 Pages.

Stolowitz Ford Cowger LLP; "Listing of Related Cases"; Jun. 18, 2010; 1 Page.

Stolowitz Ford Cowger LLP; "Listing of Related Cases"; Feb. 8, 2012; 2 Pages.

* cited by examiner

USER-INITIATED COMMUNICATIONS DURING MULTIMEDIA CONTENT PLAYBACK ON A MOBILE COMMUNICATIONS DEVICE

RELATED APPLICATIONS

The present application is a continuation of pending U.S. patent application Ser. No. 12/820,482, filed Jun. 22, 2010, which is a continuation of U.S. patent application Ser. No. 11/560,331, filed Nov. 15, 2006, now U.S. Pat. No. 7,769,363, issued Aug. 3, 2010, which claims priority of U.S. Provisional Patent Application No. 60/820,969, filed Aug. 1, 2006, all of which are incorporated by reference herein in their entirety.

FIELD OF THE INVENTION

This invention is related in general to wireless communications device applications and more specifically to the implementation of a click-through/click-to-call feature in such an application while multimedia content is being displayed.

BACKGROUND

Present day consumers expect online content to be much more immersive and interactive than before. This is true for online content being viewed on a computer, and increasingly so for content being viewed on a handheld device, especially as internet browsing on the go becomes more popular and widespread.

However, while general purpose computers today have ample resources to allow many processes to execute concurrently and to have many interrupt traps to detect user interaction, mobile devices often operate in limited operating systems with limited resources. In some circumstances, only a single program can execute at a time, making switching from one task to another somewhat challenging on mobile devices.

SUMMARY OF THE INVENTION

In accordance with the present invention, a multimedia display process traps user input signals to allow switching from display of multimedia to another task without requiring manual termination of the multimedia display process by the user. For example, a simple user input gesture can initiate a telephone call to a telephone number associated with multimedia content during playback of the multimedia content. A prompt is associated with the multimedia content to inform the user of the ability to be connected by voice communications to information related to the subject matter of the multimedia content. For example, a mobile phone can play a video showing an exhilarating drive in an automobile with an overlaid text message: "For a test drive near you, press Dial." In addition, a soft button on the mobile phone can have a label of "Dial." Pressing of the soft button by the user while the prompt is visible stops playback of the video and connects the user by telephone to a nearby dealership of the particular make of automobile shown in the video.

Embodiments of the invention provide for making the click feature visible to the consumer in an intuitive and convenient fashion within an application displaying media content, such as audio and/or video content. The consumer should be able to immediately interrupt the currently displayed media, by means of some mechanism on the device, and invoke the communications link with the content provider. The specific type of communication between the consumer and the content provider may not be static, and could change in a specific or general form over the course of time of the media being displayed.

In one embodiment, the application indicates to the consumer by visual means the option of pressing a particular button on the wireless communication device to contact the content provider via the device's telephony function. The application, upon clicking the indicated button by the consumer, immediately halts the display of the media currently being displayed, and proceeds to call the content provider. When this communications transaction is terminated, the application returns to the original browsing location before the call, whereupon browsing by the consumer can resume.

Such a feature as described here allows content providers, while displaying various types of media to a consumer, to target the consumer at a specific moment, offering the consumer an alternate path of navigation to provide the consumer with "at the moment" communication with the content provider.

Specifically, the alternate navigation path makes use of the wireless device's communications capabilities to get the consumer in direct contact with the content provider. The content provider can use such a communications channel to gather information from the consumer, or provide immediate and up to the minute information to the consumer, thus facilitating further interaction.

DETAILED DESCRIPTION

In accordance with the present invention, a mobile telecommunications device, such as mobile phone 108 (FIG. 2), presents the user with a prompt 204 indicating the availability of information associated with currently playing multimedia content, such as video 202. For example, the associated information can be made available through a telephone call that can be placed at the pressing of a soft button 208. Such makes video 202 truly interactive, allowing the user to actively seek out additional information related to the content of video 202, pausing or stopping playback of the multimedia content, in response to a single, easy, user input gesture.

From the user's perspective, the multimedia experience is very interactive-additional related information is available at the push of a single button. From the content provider's perspective, content can be made much more appealing and much more likely to draw a response by embedding a link to the content within an entertaining and eye-catching video or other multimedia content.

Figure 1:
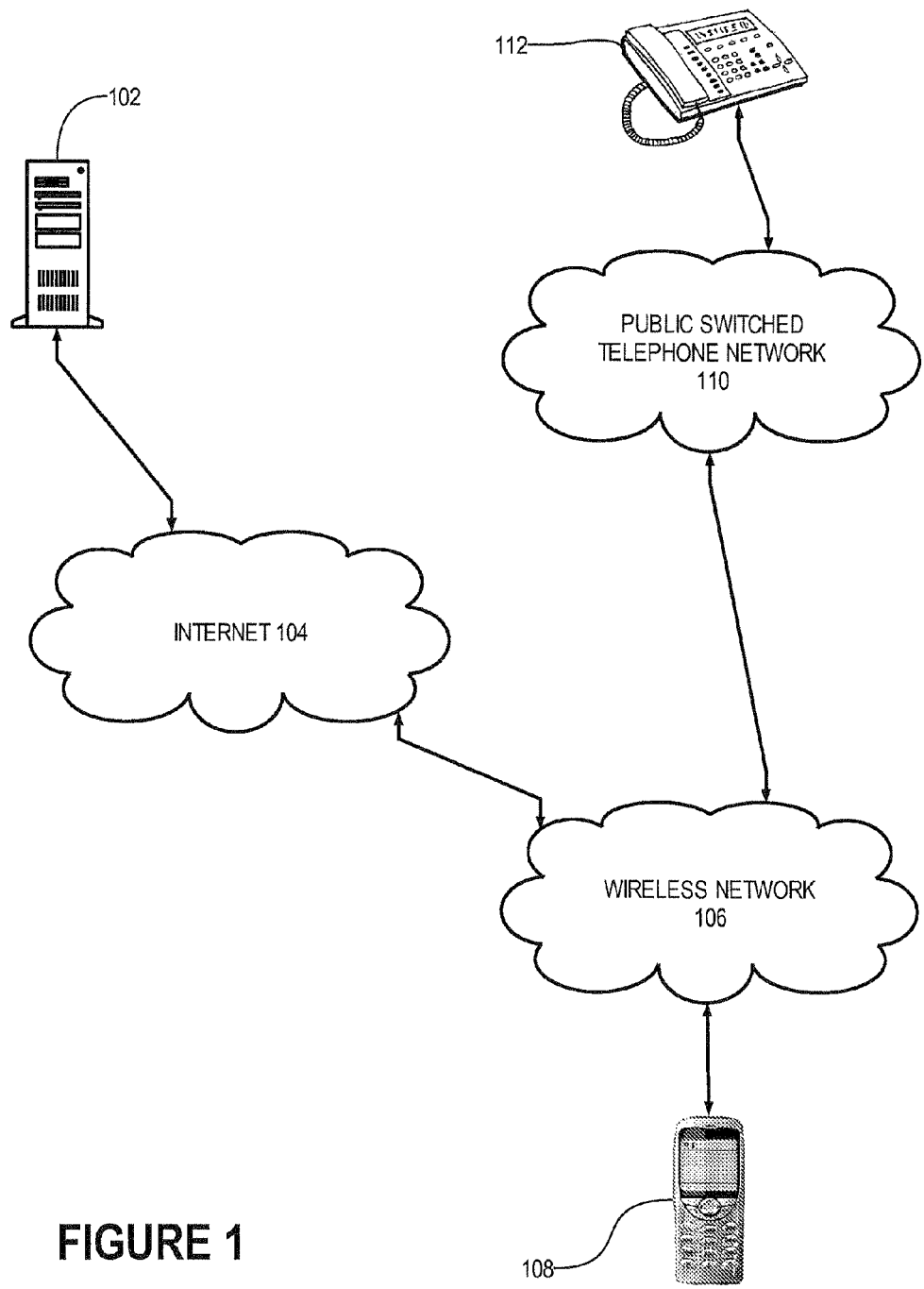
FIG. 1 is a diagram illustrating various networks, a server, telecommunications equipment, and a mobile communications device according to the present invention.

As shown in FIG. 1, mobile phone 108 is in communication with a wireless communications network 106, such as a conventional data-capable cellular telephone network for example. Wireless communications network 106 is in communication with the Internet 104 and the public switched telephone network (PSTN) 110. As a result, mobile phone 108 is capable of browsing information available through Internet 104, e.g., from server 102, and of voice communication through PSTN 110, e.g., with telephone 112.

Figure 3:
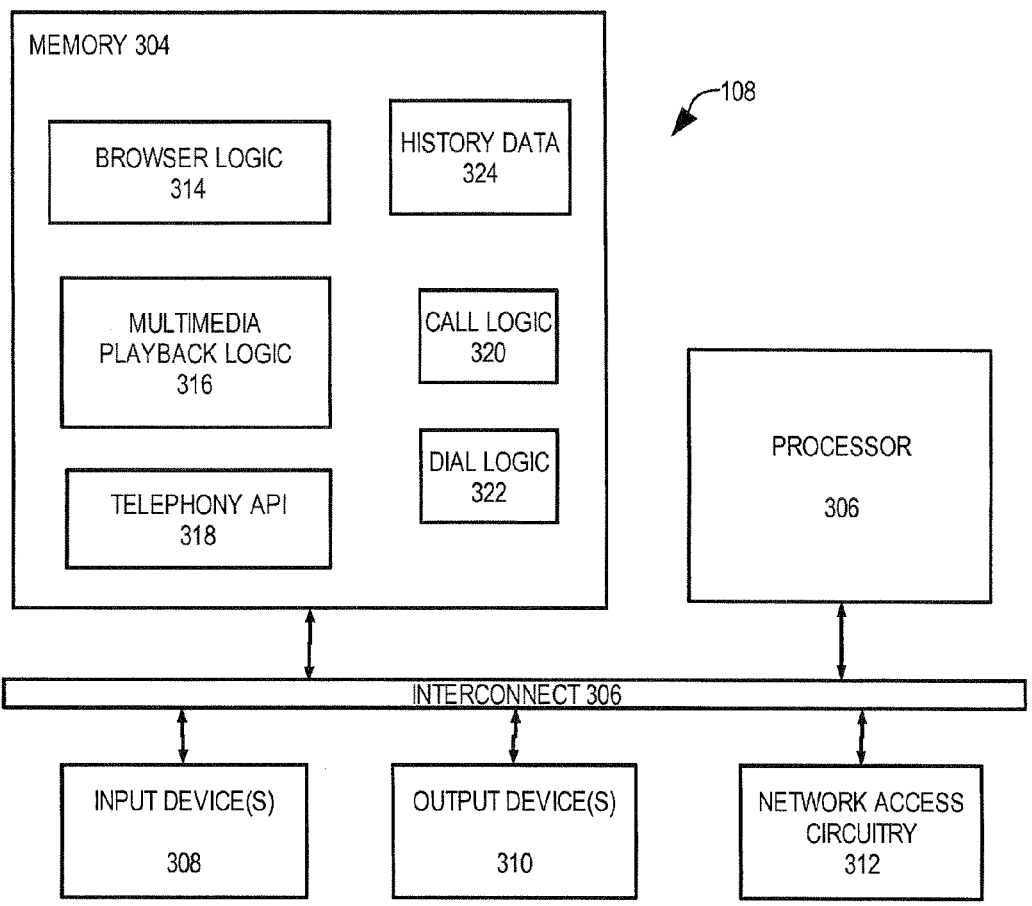
FIG. 3 is a block diagram showing the general architecture of the mobile communications device of FIG. 2.

Mobile phone 108 is a shown in diagrammatic form in FIG. 3. It should be appreciated that other devices can be used in place of mobile telephone 108, such as a smartphone, personal digital assistant (PDA), or a PDA with voice capability, for example. Mobile telephone 108 includes a microprocessor 302 that retrieves data and/or instructions from memory 304 and executes retrieved instructions in a conventional manner.

Microprocessor 302 and memory 304 are connected to one another through an interconnect 306 which is a bus in this illustrative embodiment. Interconnect 306 is also connected to one or more input devices 308, one or more output devices 310, and network access circuitry 312. Input devices 308 include a typical wireless telephone keypad in this illustrative embodiment and a microphone. Output devices 310 include a liquid crystal display (LCD) in this illustrative embodiment in addition to a speaker for playing audio received by mobile telephone 108 and a second speaker for playing ring signals. Input devices 308 and output devices 310 can also collectively include a conventional headset jack for supporting voice communication through a convention headset. Network access circuitry 312 includes a transceiver and an antenna for conducting data and/or voice communication through a network.

Browser logic 314 is a collection of instructions or data that define the behavior of mobile telephone 108 in browsing information available through Internet 104. Except as described herein, browser logic 314 is conventional.

Multimedia playback logic 316 is a collection of instructions or data that define the behavior of mobile telephone 108 in playing multimedia content, such as video 202, to the user. Multimedia playback logic 316 is responsive to commands from browser logic 314, such as to start, stop, pause, and resume playback of multimedia content for example.

Telephony API (Applications Programming Interface) 318 is a collection of instructions and data that define the behavior of mobile telephone 108 in establishing and carrying out communication through network access circuitry 312 in a conventional manner. Telephony API 318 accepts commands from other logic, such as browser logic 314, to effect telephone communications. Such commands can include dialing a specified telephone number, going off-hook, and going on-hook (i.e., hanging up), for example.

History data 320 stores data representing previous activity of browser logic 314, such as sites previously visited through Internet 104, for example.

Figure 2:
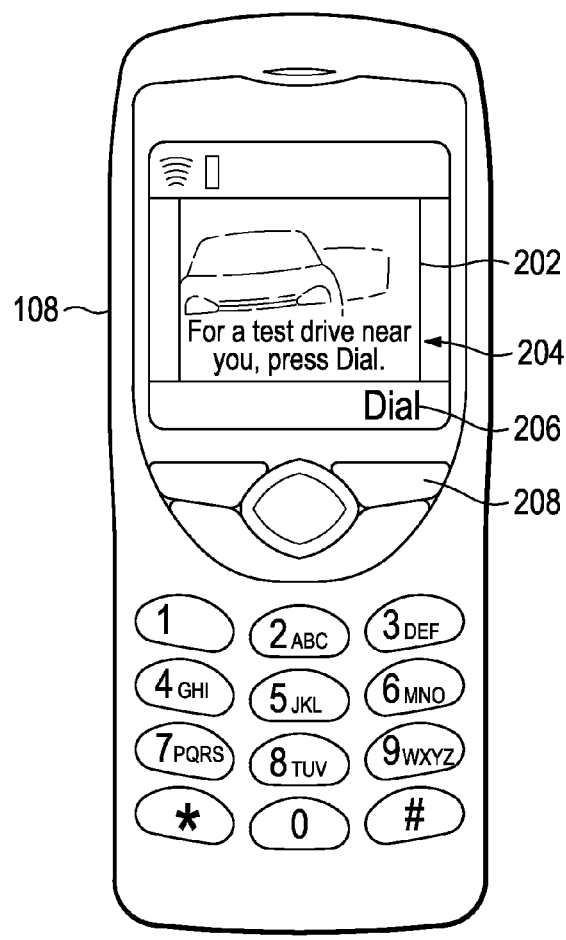
FIG. 2 shows the mobile communications device of FIG. 1 in greater detail.
Figure 4:
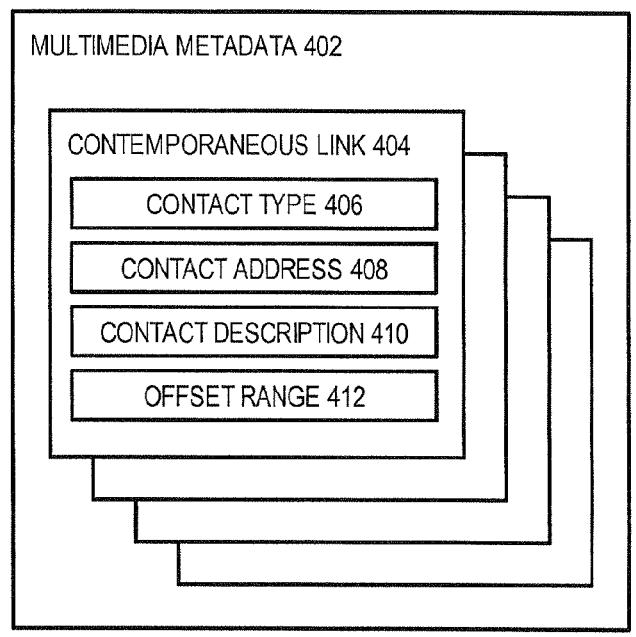
FIG. 4 is a block diagram showing multi-media meta data to enable click through and/or click-to-call features in accordance with the present invention.

For presentation to the user during playback of multimedia content, prompt 204 (FIG. 2) and label 206 for soft button 208 are described in metadata associated with the multimedia content, such as multimedia metadata 402 (FIG. 4). In this illustrative example, video 202 (FIG. 2) is served through Internet 104 (FIG. 1) by server 102 for presentation by mobile phone 108. In addition, server 102 associates multimedia metadata 402 (FIG. 4) with video 202 (FIG. 2).

When a request is received from mobile phone 108 (FIG. 1) for video 202 (FIG. 2) from server 102, server 102 sends data representing video 202 and multimedia metadata 402 (FIG. 4) in response.

Multimedia metadata 402 includes one or more contemporaneous links such as contemporaneous link 404. Contemporaneous link 404 includes data representing a contact type 406, a contact address 408, a contact description 410, and an offset range 412.

Contact type 406 specifies the type of contact associated with contemporaneous link 404. For example, the contact type can be a voice telephone call, an SMS/MMS/XMS message (referred to herein as simply an SMS message), an e-mail message, a WAP link, or an HTTP link.

Contact address 408 specifies an address to which the user is to be directed upon actuation of contemporaneous link 404. If contact type 406 specifies a voice telephone call or an SMS message, contact address 408 specifies a telephone number to dial to establish a voice telephone call or to which to send the SMS message, respectively. If contact type 406 specifies an e-mail message, contact address 408 specifies an e-mail address to which to send the e-mail message. If contact type 406 specifies a WAP or HTTP link, contact address 408 specifies a URL to which to direct browsing logic 314 upon actuation of contemporaneous link 404.

Contact description 410 specifies the appearance of a prompt, such as prompt 204 and label 206, by which the user is informed of the nature of contemporaneous link 404 and/or how to actuate contemporaneous link 404. In the illustrative example of FIG. 2, prompt 204 prompts the user by presenting the text, "For a test drive near you, press Dial." In addition, label 206 identifies soft button as "Dial." Thus, the user is informed that, by pressing soft button 208 while prompt 204 is displayed, information about how to arrange a test drive of a new automobile will be presented.

Offset range 412 specifies a beginning offset and an ending offset within video 202 between which contemporaneous link 404 is active.

Figure 5:
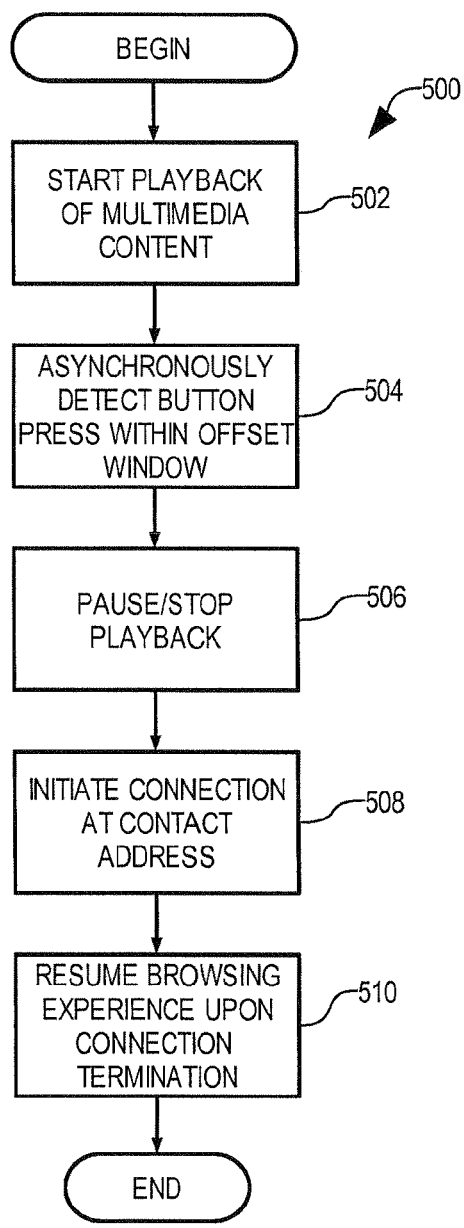
FIG. 5 is a logic flow diagram of the processing of click through and/or click-to-call features in accordance with the present invention.

Logic flow diagram 500 (FIG. 5) illustrates the behavior of mobile telephone 108 (FIG. 2) in playing video 202 and processing associated multimedia metadata 402. In step 502 (FIG. 5), browsing logic 314 initiates playback of video 202 (FIG. 2) by multimedia playback logic 316. During playback in step 502, multimedia playback logic 316 causes information of contemporaneous links, such as prompt 202, to be displayed over video 202 at times within playback of video 202 specified by offset range 412 (FIG. 4). In this illustrative embodiment, contact description 410 (FIG. 4) specifies the content of prompt 204 (FIG. 2) and label 206 to be associated with soft button 208. In an alternative embodiment, prompt 204 is added to the substantive content of video 202 using conventional video editing techniques prior to delivery of video 202 through Internet 104. In this alternative embodiment, contact description 410 (FIG. 4) specifies label 206 to be associated with soft button 208. In either case, multimedia playback logic 316 (FIG. 3) causes label 206 to be associated with soft button 208 during playback of the portion of video 202 represented by offset range 412.

In step 504 (FIG. 5), multimedia playback logic 316 (FIG. 3) asynchronously detects actuation of soft button 208 during playback of the portion of video 202 represented by offset range 412. In doing so, multimedia playback logic 316 identifies a particular contemporary link within multimedia metadata 402 by identifying the offset range within which actuation of soft button 208 is detected. In this illustrative example, the particular contemporary link is contemporary link 404.

In step 506 (FIG. 5), multimedia playback logic 316 (FIG. 3) causes multimedia playback logic 316 to pause or, alternatively, stop playback of video 202. In some mobile devices, only one process is able to execute an any given time, typically as a limitation of either the device itself or the operating system of the device. In these cases, multimedia playback logic 316 stops playback of video 202.

In step 508 (FIG. 5), multimedia playback logic 316 (FIG. 3) initiates contact according to the contemporaneous link actuated by the user. In this illustrative example, the user actuated contemporaneous link 404 and browsing logic 314 initiates contact according to contact type 406 and contact address 408. If contact type 406 and contact address 408 collectively specify a telephone call to a specified telephone number, multimedia playback logic 316 (FIG. 3) initiates a telephone call to the specified telephone number through telephony API 318. If contact type 406 and contact address 408 collectively specify an SMS message to a specified telephone number, multimedia playback logic 316 (FIG. 3) initiates sending of an SMS message to the specified telephone number through telephony API 318. If contact type 406 and contact address 408 collectively specify an e-mail message to a specified e-mail address, multimedia playback logic 316 (FIG. 3) initiates sending of an e-mail message to the specified e-mail address. If contact type 406 and contact address 408 collectively specify a WAP or HTTP URL, multimedia playback logic 316 (FIG. 3) retrieves and displays content from the specified URL.

If contact type 406 and contact address 408 collectively specify a telephone call or an SMS message to a specified telephone number and if supported by mobile telephone 108 and its operating system, processing by multimedia playback logic 316 transfers to step 510 upon termination of the specified connection. In the case of a telephone call, telephony API 318 informs multimedia playback logic 316 upon termination of the telephone call initiated in step 508. In the case of an SMS message, telephone API 314 informs multimedia playback logic 316 upon completion of sending the message.

In step 510 (FIG. 5), multimedia playback logic 316 causes browsing logic 314 to resume browsing behavior in a conventional manner and responsive to interaction with the user through input device(s) 308. In one embodiment, browser logic 314 returns to browsing at a location immediately preceding display of video 202. That location, and perhaps other locations, are stored in history data 320 (FIG. 3) to allow backtracking in a conventional manner. In another embodiment, browsing logic 314 resumes browsing at a predetermined subsequent location. For example, multimedia metadata 402 can include data specifying a URL for subsequent browsing after completion of display of video 202, e.g., as a contemporaneous link whose offset range includes the end of video 202. Upon completion of playback of video 202 or upon termination of the contact initiated in step 508, browser logic 314 can resume browsing at the location specified by the URL.

After step 510, processing according to logic flow diagram 500 completes.

It should be appreciated that, while video 202 is described above as the multimedia content with which a telephone number or other contact information is associated, other forms of multimedia can be associated with contact information the an analogous manner. For example, an audio signal can be played back to the user while a textual and/or graphical prompt informs the user to "Press Dial to order this song" or "Press Download to download this ring tone."

The above description is illustrative only and is not limiting. Instead, the present invention is defined solely by the claims which follow and their full range of equivalents.

The invention claimed is:

1. A memory device having instructions stored thereon that, in response to execution by a processing device, cause the processing device to perform operations comprising:
   receiving data and playing multimedia content included therein;
   obtaining multimedia metadata from the received data, the multimedia metadata specifying an interface element, a beginning offset, and an ending offset;
   displaying a prompt associated with the interface element of the multimedia metadata during the playing of the multimedia content, wherein the prompt is displayed within an image of the multimedia content at a position between the beginning offset and the ending offset; and
   establishing a communications channel associated with the interface element responsive to actuation of the prompt.

2. The memory device of claim 1, wherein the operations further comprise stopping the playing of the multimedia content responsive to actuation of the prompt.

3. The memory device of claim 1, wherein establishing the communications channel comprises establishing voice communications.

4. The memory device of claim 1, wherein establishing the communications channel comprises establishing a data channel to send a data message.

5. The memory device of claim 4, wherein establishing the data channel comprises decoding, from the received data, one of a telephone number or an email address to send the data message.

6. The memory device of claim 1, wherein the prompt comprises a textual message.

7. The memory device of claim 1, wherein the received data specifies a contact type configured to define a type of contact associated with the interface element.

8. The memory device of claim 1, wherein the received data specifies a contact description configured to provide descriptive information associated with the interface element.

9. An apparatus, comprising:
   means for receiving data and playing multimedia content included therein;
   means for obtaining multimedia metadata from the received data, the multimedia metadata specifying an interface element, a beginning offset, and an ending offset;
   means for displaying a prompt associated with the interface element of the multimedia metadata during the playing of the multimedia content, wherein the prompt is displayed within an image of the multimedia content at a position between the beginning offset and the ending offset; and
   means for establishing a communications channel associated with the interface element responsive to actuation of the prompt.

10. The apparatus of claim 9, further comprising means for stopping the playing of the multimedia content responsive to actuation of the prompt.

11. A method, comprising:
    receiving data and playing multimedia content included therein;
    obtaining multimedia metadata from the received data, the multimedia metadata specifying an interface element, a beginning offset, and an ending offset;
    displaying a prompt associated with the interface element of the multimedia metadata during the playing of the multimedia content, wherein the prompt is displayed within an image of the multimedia content at a position between the beginning offset and the ending offset; and
    establishing a communications channel associated with the interface element responsive to actuation of the prompt.

12. The method of claim 11, wherein the operations further comprise stopping the playing of the multimedia content responsive to actuation of the prompt.

13. The method of claim 11, wherein establishing the communications channel comprises establishing voice communications.

14. The method of claim 11, wherein establishing the communications channel comprises establishing a data channel to send a data message.

15. The method of claim 14, wherein establishing the data channel comprises decoding, from the received data, one of a telephone number or an email address to send the data message.

16. The method of claim 11, wherein the prompt comprises a textual message.

17. The method of claim 11, wherein the received data specifies a contact type configured to define a type of contact associated with the interface element.

18. The method of claim 11, wherein the received data specifies a contact description configured to provide descriptive information associated with the interface element.

19. An apparatus, comprising:
a processing device configured to:
    receive data and play multimedia content included therein;
    obtain multimedia metadata from the received data, the multimedia metadata specifying an interface element, a beginning offset, and an ending offset;
    display a prompt associated with the interface element of the multimedia metadata during the playing of the multimedia content, wherein the prompt is displayed within an image of the multimedia content at a position between the beginning offset and the ending offset; and
    establish a communications channel associated with the interface element responsive to actuation of the prompt.

20. The apparatus of claim 19, wherein the processing device is further configured to stop the playing of the multimedia content responsive to actuation of the prompt.

\* \* \* \* \*

UNITED STATES PATENT AND TRADEMARK OFFICE
CERTIFICATE OF CORRECTION

PATENT NO. : 8,606,238 B2  
APPLICATION NO. : 13/369162  
DATED : December 10, 2013  
INVENTOR(S) : Chew et al.

Page 1 of 1

It is certified that error appears in the above-identified patent and that said Letters Patent is hereby corrected as shown below:

In the Specification

In Column 4, Line 39, delete "prompt 202," and insert -- prompt 204, --, therefor.

In Column 5, Line 30, delete "API 314" and insert -- API 318 --, therefor.

Signed and Sealed this  
Twentieth Day of May, 2014

Michelle K. Lee  
*Deputy Director of the United States Patent and Trademark Office*